(12) United States Patent
Sauer et al.

(10) Patent No.: US 6,314,344 B1
(45) Date of Patent: Nov. 6, 2001

(54) AUTOMATED ORBIT COMPENSATION SYSTEM AND METHOD

(75) Inventors: Birgit Sauer, Cupertino; John S. Higham, Mountain View, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/528,474

(22) Filed: Mar. 17, 2000

(51) Int. Cl.$^7$ ..................................................... B64G 1/24
(52) U.S. Cl. ......................................... 701/13; 244/158 R
(58) Field of Search .................................. 701/13, 14, 15, 701/226; 244/158 R, 164, 165, 169, 171, 176

(56) References Cited

U.S. PATENT DOCUMENTS

| | | | | |
|---|---|---|---|---|
| 5,109,346 | * | 4/1992 | Wertz | 701/226 |
| 5,528,502 | * | 6/1996 | Wertz | 701/226 |
| 5,687,084 | * | 11/1997 | Wertz | 701/226 |
| 5,992,779 | * | 11/1999 | Gamble et al. | 244/164 |
| 5,992,799 | * | 11/1999 | Gamble et al. | 244/164 |
| 6,023,291 | * | 2/2000 | Kamel et al. | 348/147 |
| 6,142,423 | * | 11/2000 | Wehner | 244/164 |

* cited by examiner

*Primary Examiner*—William A. Cuchlinski, Jr.
*Assistant Examiner*—Marthe Marc-Coleman
(74) *Attorney, Agent, or Firm*—Kenneth W. Float

(57) ABSTRACT

An automated spacecraft orbit compensation system and method that maintains a spacecraft in a desired orbit. The spacecraft orbit compensation system and method is automated to minimize human intervention. The system includes apparatus for determining orbital errors (ranging data) and apparatus for determining the duration and orbital location of thruster firings to correct the orbit. Each of the apparatus are located at a ground station. The system and method generates ranging data indicative of the range of the spacecraft. The ranging data are processed to estimate the orbit of the spacecraft. The estimated orbit is used to compute a thruster burn plan for the following N days. The thruster burn plan is uploaded to the spacecraft. The above steps are repeated at regular intervals.

17 Claims, 4 Drawing Sheets

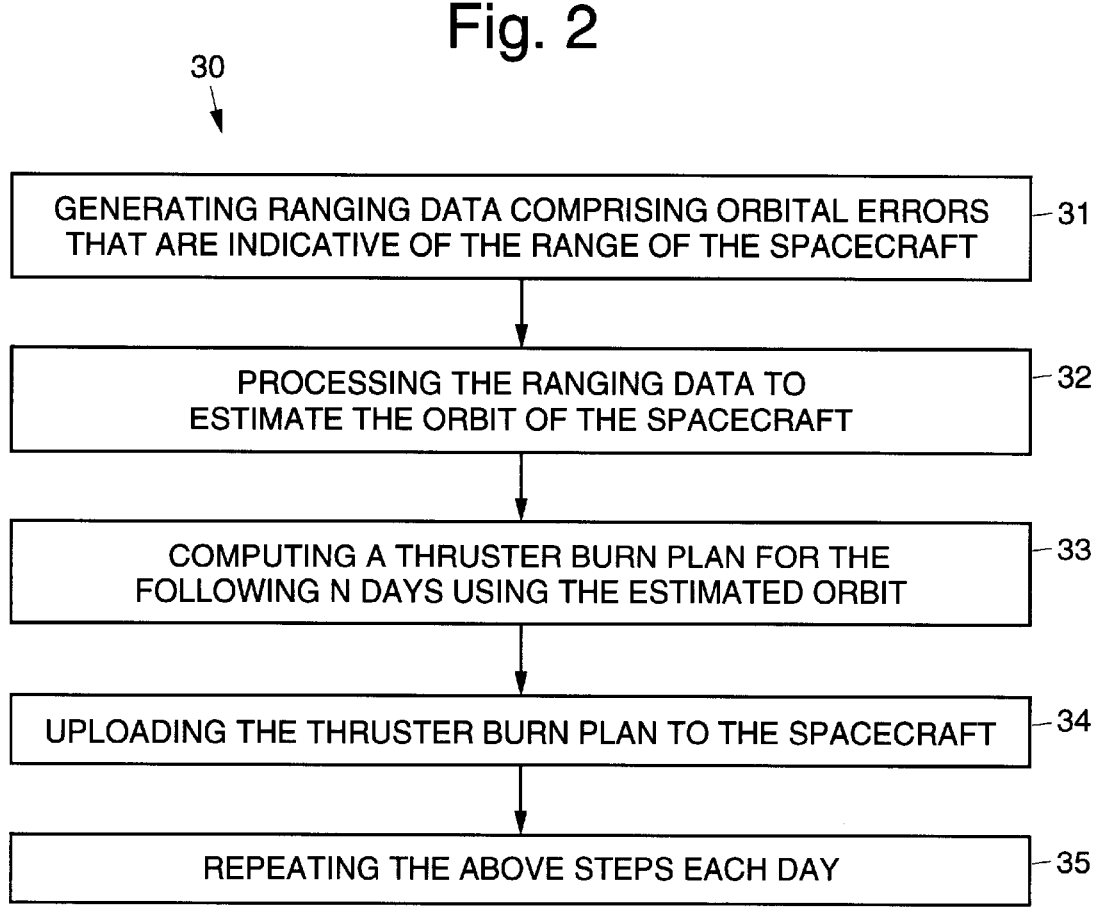

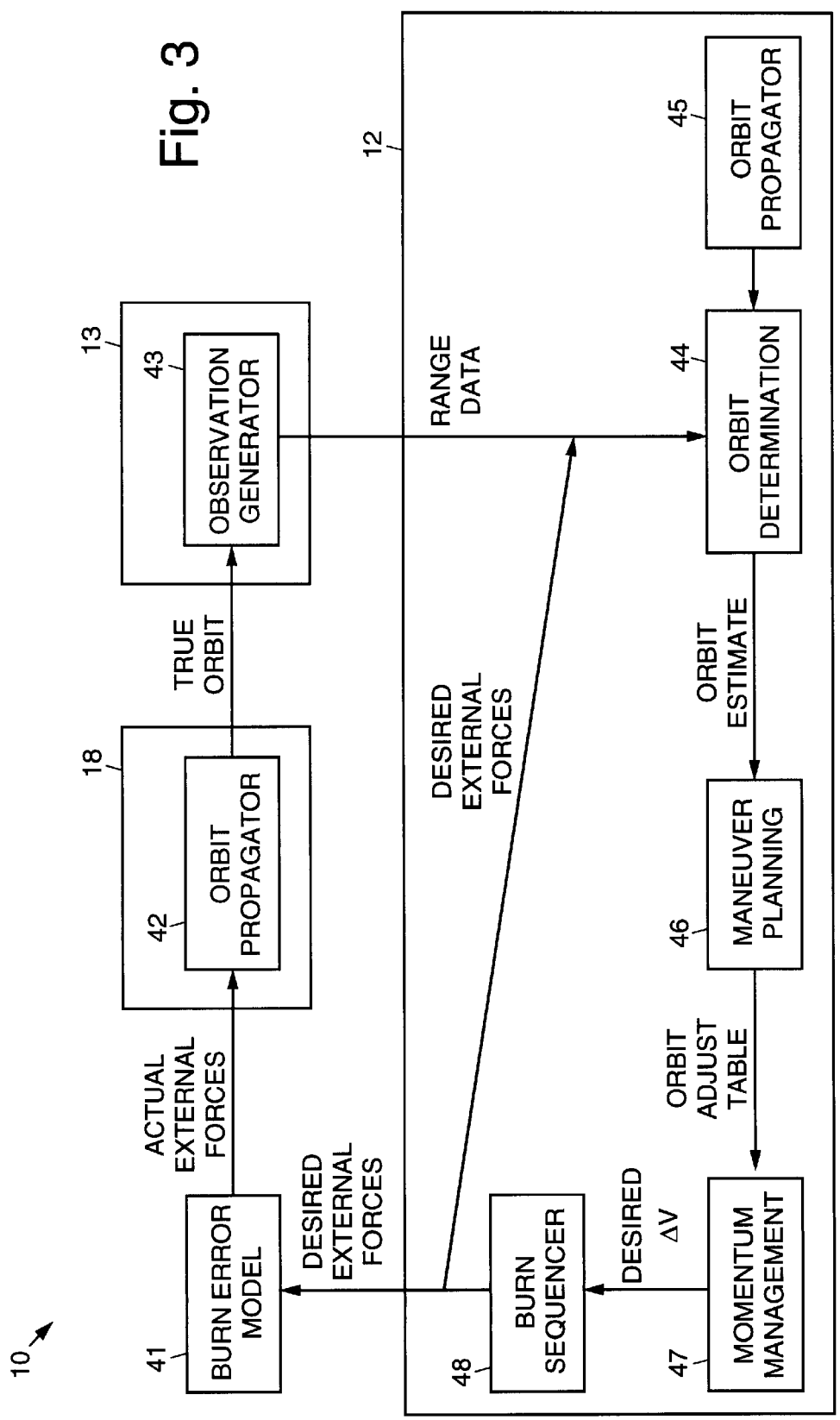

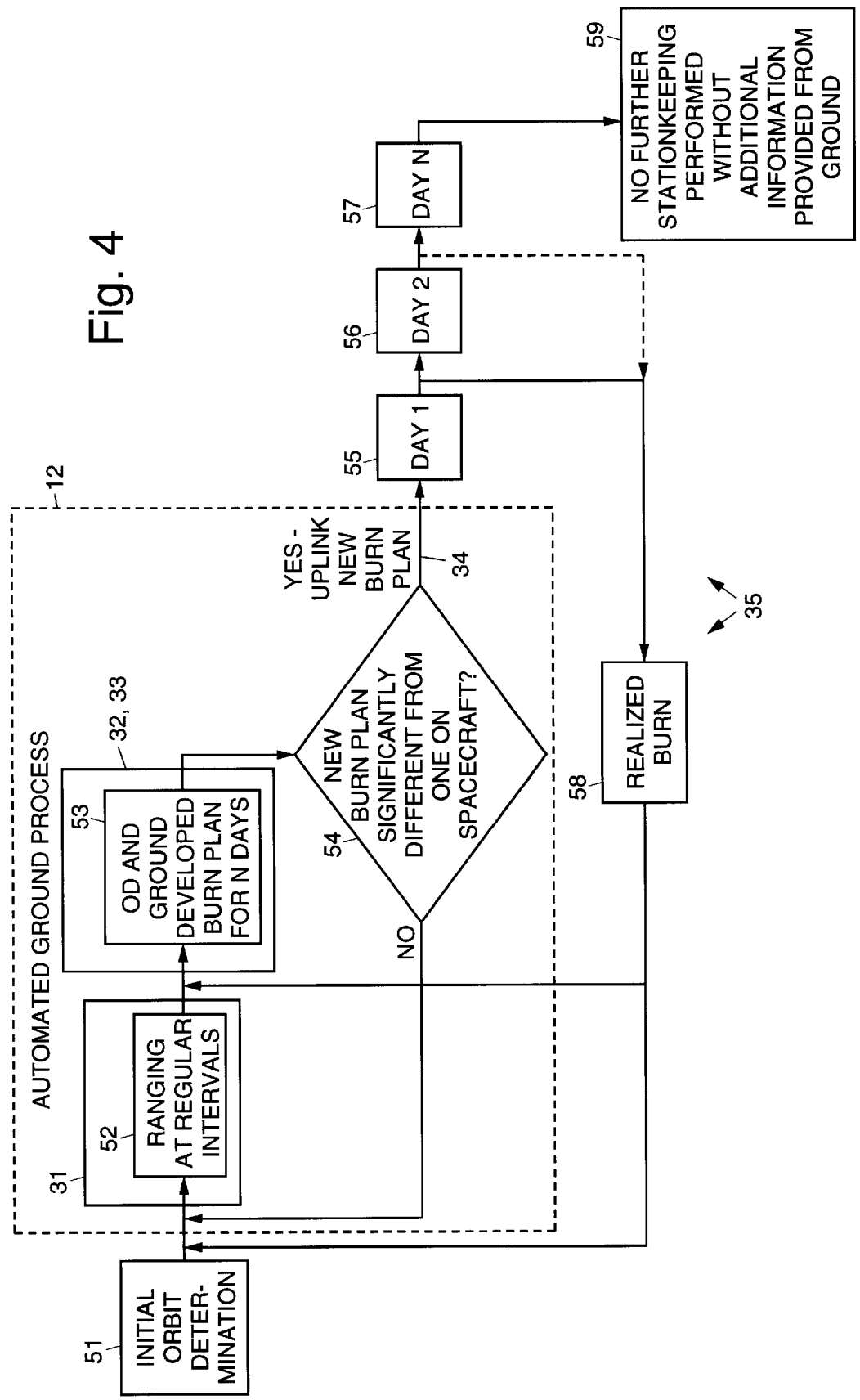

AUTOMATED ORBIT COMPENSATION SYSTEM AND METHOD

BACKGROUND

The present invention relates generally to spacecraft orbit maintenance systems, and more particularly, to an automated spacecraft orbit compensation system designed for a geosynchronous (GEO) satellite.

The assignee of the present invention manufactures and deploys spacecraft that orbit the Earth. Most stationkeeping is performed with a human operator which results, in substantial manpower costs when the stationkeeping is performed frequently. U.S. Pat. Nos. 5,528,502 and 5,687,084 entitled "Satellite Orbit Maintenance System" disclose an automated orbit-maintenance system which is located on-board a spacecraft.

More particularly, U.S. Pat. Nos. 5,528,502 and 5,687,084 entitled "Satellite Orbit Maintenance System" disclose techniques for maintaining a satellite in an assigned Low Earth Orbit (LEO) without control or intervention from the ground. Autonomously obtained navigational data provide a measurement of the actual orbit in which the satellite is traveling. So long as the measured orbit conforms to a desired orbit to within a preselected tolerance, periodic corrections of equal magnitude are made to the satellite's velocity, based on a prediction of the effect of atmospheric drag on the orbit.

Measurement of the orbit is made by observation of the time that the satellite passes a reference point in the orbit, such as by crossing the ascending node. If the measured orbit departs from the desired orbit by more than the preselected tolerance a velocity correction of a magnitude different from the one based on prediction is applied to the satellite.

For a decaying orbit, the magnitude of the velocity correction is increased above the correction value based on prediction. For a rising orbit, the magnitude of the velocity correction is decreased below the value based on prediction. It may be reduced to zero in low earth orbit (LEO) if the prediction shows that the atmospheric drag will bring the measured orbit back within the preselected tolerance range.

Accordingly, it is an objective of the present invention to provide for an improved automated spacecraft orbit compensation system that is not located on-board a spacecraft, and does not rely on natural perturbations to bring the measured orbit back within a preselected tolerance range. The present invention is also geared toward GEO rather than LEO satellites.

SUMMARY OF THE INVENTION

To accomplish the above and other objectives, the present invention provides for an improved automated spacecraft orbit compensation system and method that maintains a spacecraft in a desired orbit. The present spacecraft orbit compensation system and method is automated to minimize human intervention.

The automated spacecraft orbit compensation system includes apparatus for determining the current orbit, apparatus for determining the duration and location of orbital thruster firings to correct the orbit, and apparatus for communicating between the satellite and the ground. Each of the apparatus are located at a ground station.

More particularly, an orbit determination system is coupled between an antenna and the planning system The orbit determination system generates the current orbit estimate, while the planning system comprises a process that computes a thruster bum plan for the following N days. A transmitter is coupled between the planning system and the antenna. The transmitter is used to transmit the orbit and burn plan information to a control processor on-board the spacecraft. The control processor fires thrusters on the spacecraft to control the orbit of the spacecraft. The entire process is repeated at regular intervals (less than N), computing a new orbit and uploading the new thruster burn plan each time.

The method generates an estimation of the current orbit. The estimated orbit is used to compute a thruster burn plan for the following N days. The thruster burn plan is uploaded to the spacecraft. The above steps are repeated at regular intervals (generally every day, but always less than N).

There are various methods of estimating the orbit. One way is through a modified version of conventional ranging. Ranging antennas generate data indicative of the range of the satellite from the antenna. In addition, spacecraft telemetry from the last bum is also collected. A filter or sequential batch process is used to estimate the orbit from the last orbit estimate, the range data, and the telemetry. The burn can also be estimated if desired. Using the spacecraft telemetry reduces the amount of range data required and enhances the accuracy of the orbit.

Since the process is repeated at regular and frequent intervals, the thruster burn plan can be computed in a manner similar to a feedback control system. Orbit errors can be corrected gradually over the span of several days rather than corrected all at once. This allows for a more robust system that minimizes the amount of propellant used.

The present invention results in substantial manpower savings over human-operated systems. Unlike U.S. Pat. Nos. 5,528,502 and 5,687,084, the present invention does not require the system to be located on the spacecraft which has several advantages. For example, non-flight hardware can be used which provides better performance at a lower cost, and allows for hardware maintenance/repair and easy software updates.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 illustrates an exemplary automated spacecraft orbit compensation method in accordance with the principles of the present invention;

FIG. 3 illustrates a ground-based simulation of the system shown in FIG. 1; and

FIG. 4 is an alternative representation of the method shown in FIG. 2.

DETAILED DESCRIPTION

Figure 1:
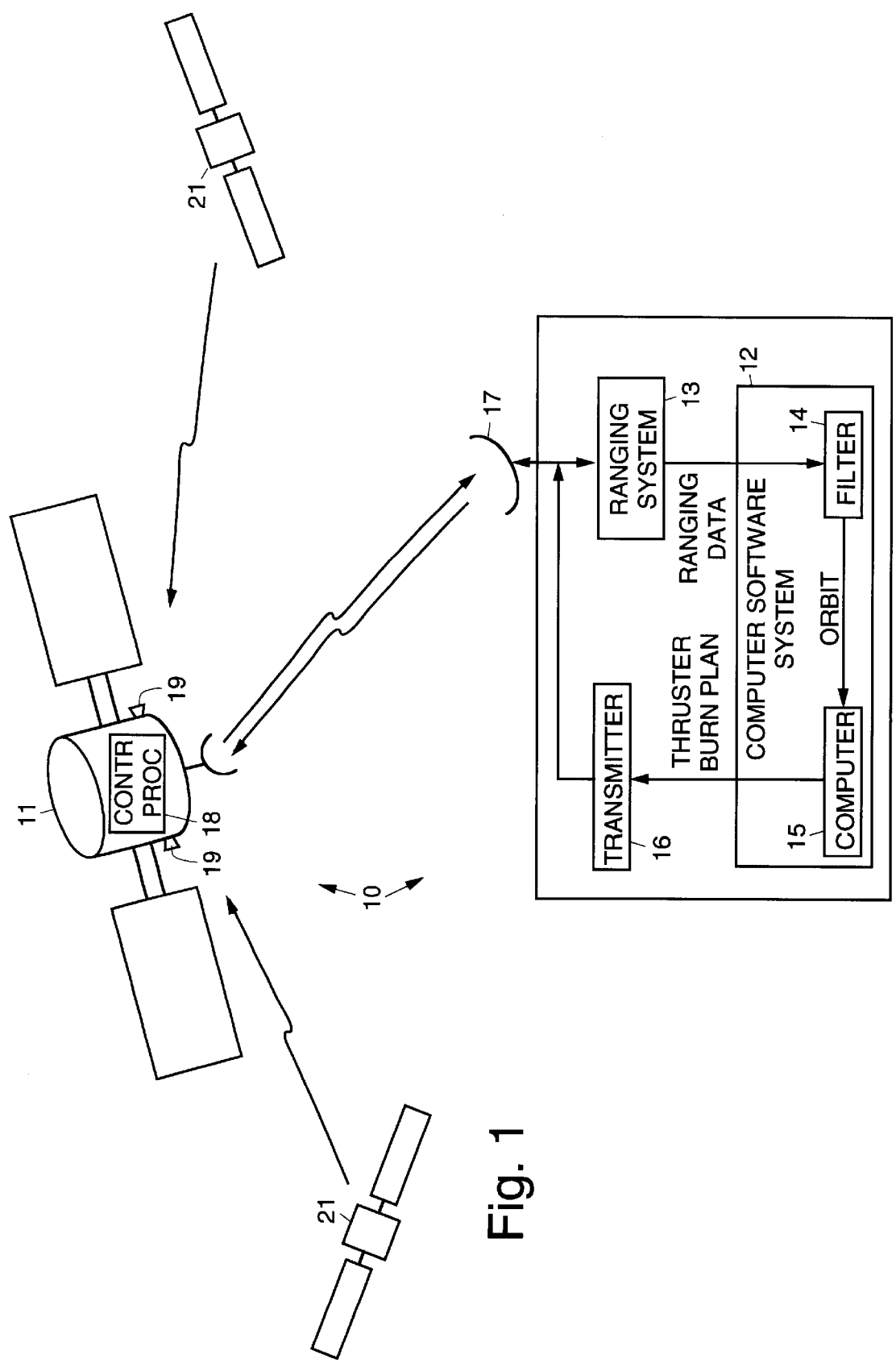
FIG. 1 illustrates an exemplary automated spacecraft orbit compensation system in accordance with the principles of the present invention.

Referring to the drawing figure FIG. 1 illustrates an exemplary automated spacecraft orbit compensation system 10 in accordance with the principles of the present invention for use in automatically controlling or maintaining the orbit of a spacecraft 11. The following description is of a preferred embodiment of the automated spacecraft orbit compensation system 10, and is not intended to limit the scope or form of the invention.

The exemplary, embodiment of the automated spacecraft orbit compensation system 10 comprises a ground-based planning system 12. A ranging system 13 is coupled between an antenna 17 and the planning system 12. A transmitter 16 is coupled between the planning system 12 and the antenna 17. The ranging system 13 generates data comprising ranges from the antenna to the spacecraft that are indicative of the orbit of the spacecraft. The filter 14 or sequential batch process 14 uses this data to provide an orbit determination estimate. The ranging system 13 may be replaced by the global positioning system, or a system that operates in a similar manner as the global positioning system. The transmitter 16 is used to transmit the burn plan and other information generated by the software system 12 to a control processor (CONTR PROC) 18 on-board the spacecraft 11. The control processor 18 fires thrusters 19 on the spacecraft 11 to control the orbit of the spacecraft 11.

The ground-based software system 12 receives automated ranging data from the ranging system 13 on a frequent, regular basis. The ranging data, along with the spacecraft telemetry from the previous burns (thruster current, voltage position, etc.), are processed by a filter 14 or sequential batch process 14 in the ground-based software system 12 to estimate the orbit of the spacecraft 11.

The software system 12 also has a planning system 15 that computes a thruster burn plan for the following N days for the spacecraft 11, and autonomously uploads that information to the spacecraft 11 by way of the transmitter 16 and antenna 17. The software system 12 repeats this process at regular intervals (nominally daily, but always less than N), uploading and replacing the currently-used thruster burn plan on the spacecraft 11 each time. Although the process is repeated frequently, the N-day thruster burn plan provides protection against problems such as communication link downtime.

Referring to FIG. 2, it illustrates an exemplary automated spacecraft orbit compensation method 30 in accordance with the principles of the present invention. The automated spacecraft orbit compensation method 30 comprises the following steps.

The method generates 31 ranging data comprising orbital errors that are indicative of the range of the spacecraft 11. The ranging data and the spacecraft telemetry of the previous burns are processed 32 to estimate the orbit of the spacecraft 11. The estimated orbit is used to compute 33 a thruster burn plan for the following N days. The thruster burn plan is uploaded 34 to the spacecraft 11. The above steps are repeated 35 each at regular intervals (nominally daily, but always less than N).

FIG. 3 illustrates a ground-based simulation of the system 10 shown in FIG. 1. The ground-based planning system 12 comprises an orbit propagator 45 that outputs data indicative of a proposed orbit of a spacecraft. The orbit propagation data is processed by orbit determination software 44 along with range data and desired external forces that were output by the last iteration of the ground-based planning system 12 to generate an orbit determination or estimate. The orbit estimate is input to maneuver planning software 46 that outputs an orbit adjustment table. The orbit adjustment table is input to momentum management software 47 that output a desired delta-V which is input to a burn sequencer 48. The output of the burn sequencer 48 is data indicative of the desired external forces exerted on the spacecraft.

The desired external forces are input to a burn error model 41 that outputs the actual external forces exerted en the spacecraft. The actual external forces are processed by an orbit propagator 42 corresponding to the control processor 18 in the spacecraft that outputs the true orbit of the spacecraft. The true orbit is processed by an observation generator 42 comprising the ranging system 13. The output of the observation generator 42 comprises range data that is input to the orbit determination software 44 with the desired external forces and the output of the orbit propagator 45.

FIG. 4 is an alternative representation of the method 30 shown in FIG. 2. An initial orbit determination 51 is generated and input to an automated ground process corresponding to the ground-based planning system 12. Ranging data is generated 31 which produces ranging data 52 at regular intervals. The regular interval ranging data is processed 33, 34 to generate a burn plan for N days 53.

The N-day burn plan is evaluated 54 to determine if it is significantly different from the burn plan used by the spacecraft. If the new burn plan is significantly different, then it is uplinked 34 to the spacecraft. If the new burn plan is not significantly different, then the automated ground process repeats 35.

The computed N-day burn plan is executed 55, 56, 57 for each of the N days. For each day of the N-day burn plan, data indicative of the realized burn 58 is fed back to the automated ground process. At the end of the Nth day stationkeeping is no longer performed 59 without additional information uplinked from the ground.

Thus, improved automated spacecraft orbit compensation systems and methods have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An automated spacecraft orbit compensation system for maintaining a spacecraft containing a control processor and one or more thrusters in a desired orbit, comprising:

ground-based orbit determination system that uses gathered data to generate an estimate of the orbit of the spacecraft;

a ground-based planning system coupled to the orbit determination system for computing a thruster burn plan for the following N days based on the estimated orbit of the spacecraft; and a transmitter coupled to the planning system for transmitting information generated by the planning system to the control processor on-board the spacecraft which fires one or more thrusters to control the orbit of the spacecraft.

2. The system recited in claim 1 wherein the orbit determination system uses data gathered from the global positioning system.

3. The system recited in claim 1 wherein the orbit determination system uses data gathered from a global positioning-like system.

4. The system recited in claim 1 wherein the orbit determination system uses data gathered from a ranging system.

5. The system recited in claim 4 wherein the orbit determination system comprises a filter.

6. The system recited in claim 5 wherein the planning system and transmitter compute and upload the thruster burn plan every M days, where M is not necessarily an integer.

7. The system recited in claim 4 wherein the orbit determination system comprises a sequential batch process.

8. The system recited in claim 4 wherein the orbit determination system uses spacecraft telemetry and range data to determine the orbit.

9. The system recited in claim 1 wherein the planning system and transmitter autonomously and repeatedly upload the thruster burn plan for the following N days to the spacecraft.

10. An automated spacecraft orbit compensation method for maintaining a spacecraft in a desired orbit, comprising the steps of:

generating an estimate of the orbit of the spacecraft at a ground station;

computing, at the ground station, a thruster burn plan for the following N days using the estimated orbit;

uploading the thruster burn plan from the ground station to the spacecraft; and repeating the above steps at a regular interval.

11. The method recited in claim 10 wherein the step of generating an estimate of the orbit of the spacecraft uses global positioning system data.

12. The method recited in claim 10 wherein the step of generating an estimate of the orbit of the spacecraft uses global positioning-like system data.

13. The method recited in claim 10 wherein the step of generating an estimate of the orbit of the spacecraft uses range data.

14. The method recited in claim 13 wherein the step of generating an estimate of the orbit of the spacecraft comprises the step of filtering the range data to estimate the orbit of the spacecraft.

15. The method recited in claim 13 wherein the step of generating an estimate of the orbit of the spacecraft comprises the step of sequentially batch processing the range data to estimate the orbit of the spacecraft.

16. The method recited in claim 13 wherein the step of generating an estimate of the orbit of the spacecraft comprises the step of using spacecraft telemetry and range data to estimate the orbit of the spacecraft.

17. The method recited in claim 10 further comprising a momentum management control step.

* * * * *